United States Patent [19]

Lywood et al.

[11] Patent Number: 5,030,440
[45] Date of Patent: Jul. 9, 1991

[54] HYDROGEN PRODUCTION

[75] Inventors: Warwick J. Lywood; Martyn V. Twigg, both of Yarm, England

[73] Assignee: Imperial Chemical Industries PLC, London, England

[21] Appl. No.: 381,259

[22] Filed: Jul. 18, 1989

[30] Foreign Application Priority Data

Jul. 22, 1988 [GB] United Kingdom ............. 8817480

[51] Int. Cl.[5] ........................... C01B 3/16; C01B 3/48
[52] U.S. Cl. .................................... 423/655; 252/373; 423/652; 423/656
[58] Field of Search ................... 423/656, 652, 655; 252/373

[56] References Cited

U.S. PATENT DOCUMENTS

| | | | |
|---|---|---|---|
| 3,850,840 | 11/1974 | Aldridge et al. | 423/656 |
| 4,233,180 | 11/1980 | Hausberger et al. | 423/655 |
| 4,257,920 | 3/1981 | Sugier et al. | 423/656 |
| 4,338,292 | 7/1982 | Duranleau | 423/656 |
| 4,452,854 | 6/1984 | Merriam et al. | 423/655 |

FOREIGN PATENT DOCUMENTS

| | | | |
|---|---|---|---|
| 1060166 | 3/1967 | United Kingdom. | |
| 1408560 | 10/1975 | United Kingdom | 423/655 |
| 2179366 | 3/1987 | United Kingdom. | |

OTHER PUBLICATIONS

Springer-Verlag New York Inc., Catalyst Handbook, Wolfe Scientific Books, 1970, p. 23.

*Primary Examiner*—Wayne A. Langel
*Attorney, Agent, or Firm*—Cushman, Darby & Cushman

[57] ABSTRACT

A gas stream containing hydrogen, carbon monoxide, and steam, and having a steam to dry gas molar ratio below 0.5 and a steam to carbon monoxide molar ratio above 0.5, and that has been formed at a temperature above 700° C., is passed, at a temperature within the range 550° to 650° C., over an iron-free catalyst effective at such temperatures to catalyze the shift reaction. This effects some shift reaction thus increasing the amount of high grade heat that can be recovered from the gas. Also the hydrogen content of the gas is increased and the carbon monoxide to carbon dioxide ratio of the gas is decreased, thus decreasing the risk of hydrocarbon formation if the gas is subsequently subjected to a further shift reaction using an iron-oxide containing catalyst. Suitable catalysts comprise palladium and/or an oxide of an alkali, or alkaline earth, metal on a refractory support.

8 Claims, 1 Drawing Sheet

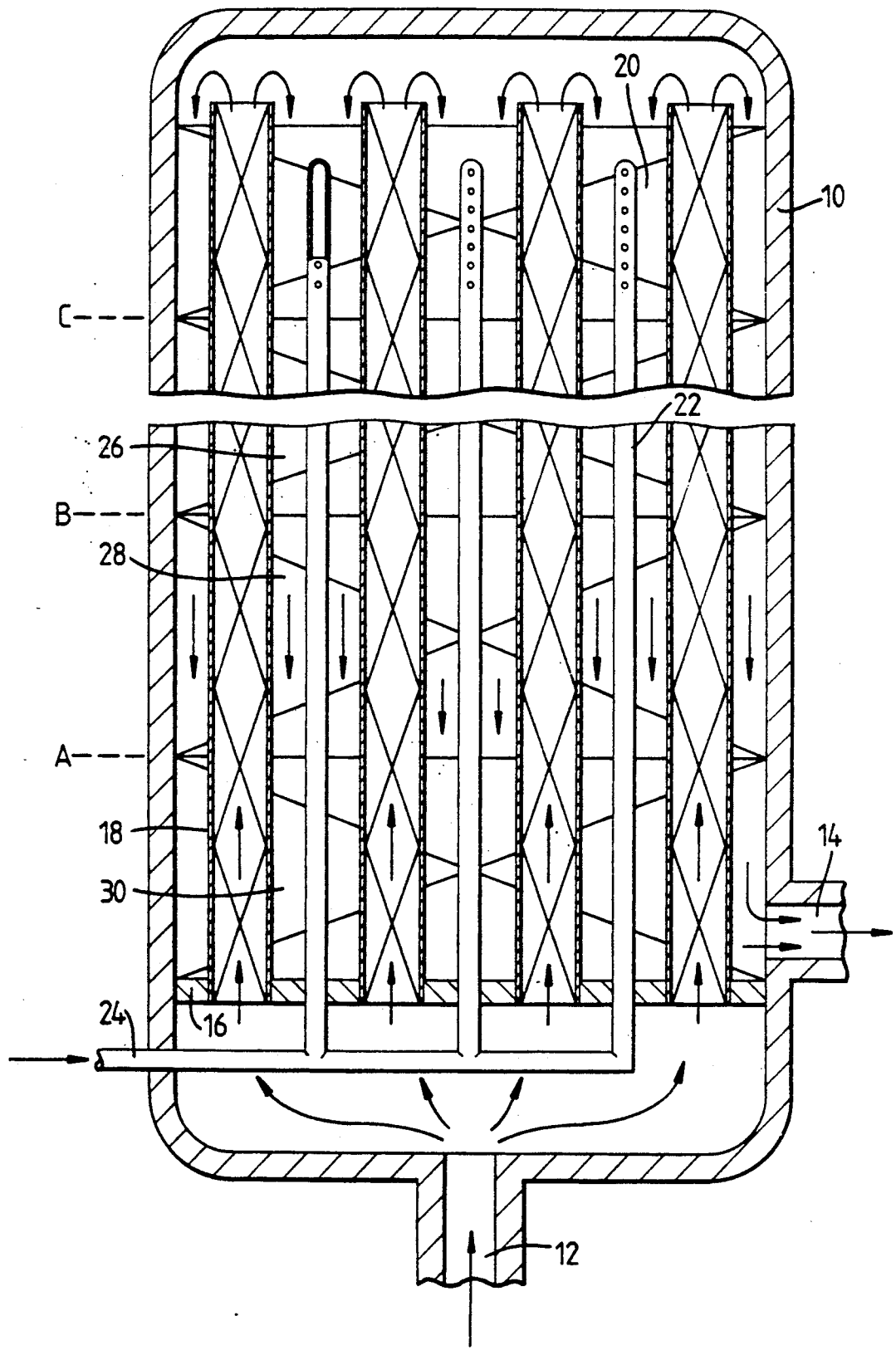

HYDROGEN PRODUCTION

This invention relates to hydrogen and in particular to the production of a hydrogen-containing gas stream from a carbonaceous feedstock. Such processes are well known and involve the steam reforming of a hydrocarbon feedstock, e.g. natural gas, or of a hydrocarbon derivative e.g. methanol, or the partial oxidation, using an oxygen-containing gas, e.g. substantially pure oxygen, air, or oxygen-enriched or oxygen-depleted air, of a hydrocarbon, or hydrocarbon derivative, feedstock or of a solid carbonaceous feedstock such as coal. Such gas generation processes produce a gas stream at a relatively high temperature, normally above 700° C., containing hydrogen, carbon monoxide, and steam, and usually also some carbon dioxide. The gas stream will normally contain some methane together with any inert gases, e.g. nitrogen, that were present in the reactants.

In order to increase the hydrogen content of the gas stream it is well known to subject the gas stream to the shift reaction $$CO + H_2O \rightarrow CO_2 + H_2$$

by passage of the gas through a bed of a suitable catalyst.

The forward shift reaction equilibrium is favoured by low temperatures. However since the reaction is exothermic, unless steps are taken such as cooling the gas while in the catalyst bed, the temperature rise occurring if the feed contains a substantial amount of carbon monoxide is often such that low outlet temperatures can not achieved and/or the catalysts effective at low outlet temperatures are rapidly de-activated. For this reason the shift reaction is often carried out in two stages; the first stage (high temperature shift) employing a catalyst comprising iron oxide, e.g. an iron oxide/chromia catalyst, and, after some form of inter-bed cooling, the second stage (low temperature shift) employing a copper-containing catalyst.

In use, the iron oxide in the high temperature shift catalyst may be reduced to a state wherein the catalyst tends to catalyse the Fischer-Tropsch reaction forming hydrocarbons. Reduction of the iron oxide to such a state is thus desirably avoided. We have found that for high temperature shift using conventional iron oxide/chromia catalysts and conventional high temperature shift exit temperatures, e.g. in the range of about 350°-500° C., the risk of hydrocarbon formation occurs when the shift inlet gas composition has a parameter $Z$ above about 4 bar abs., where $Z$ is given by the formula $$Z = [CO]^2 \cdot [H_2]/([CO_2] \cdot [H_2O])$$

where $[CO]$, $[H_2]$, $[CO_2]$ and $[H_2O]$ represent the partial pressures (in bar abs.) of carbon monoxide, hydrogen, carbon dioxide, and steam respectively in the shift inlet gas.

The gasification stage is normally operated at a pressure in the range 5 to 50 bar abs., and in particular in the range 10 to 40 bar abs. The temperature at which the gasification stage is effected will normally be in the range 800° to 1200° C., particularly 750° to 1100° C.

The value of Z will depend on the conditions employed in the gasification stage, i.e. the reforming or partial oxidation stage. Increasing the outlet temperature, increasing the pressure, and/or decreasing the steam to feedstock carbon ratio (i.e. moles of steam per g atom of feedstock carbon) employed in the gasification stage, all tend to increase the carbon monoxide partial pressure and increase the value of Z. Where air is used in a partial oxidation or secondary reforming process as a source of oxygen, increasing the outlet temperature: however the increased amount of air has the effect of increasing the volume of gas and so the net effect on the carbon monoxide partial pressure, and the value of Z, may be small.

Generally the steam to feedstock carbon ratio has a significant effect on the carbon monoxide partial pressure and on the value of Z, and in order to keep the value of Z at a level below about 4 bar abs. so as to minimise risk of formation of hydrocarbons in a subsequent high temperature shift stage employing an iron oxide catalyst, it has generally been necessary to employ a gas mixture containing a substantial amount of steam (so that the steam to dry gas molar ratio is greater than about 0.5) and/or to employ gasification conditions such that the molar ratio of carbon monoxide to carbon dioxide in the gas stream is limited to no more than about 1.9. These limits on the steam to dry gas ratio and carbon monoxide to carbon dioxide molar ratio needed to keep Z below about 4 bar abs. may vary somewhat, depending for example upon the pressure of operation.

Where the gasification process involves steam reforming, it is possible to operate with a sufficient excess of steam that such problems are avoided. However the generation of such an excess of steam is not energy efficient and, in the interests of economy, it is desirable to operate steam reforming processes at low steam to carbon ratios so that the reformed gas stream fed to the shift stage has a relatively low steam to dry gas molar ratio, particularly below 0.5. Practical steam reforming processes however give gas compositions having a steam to dry gas molar ratio above 0.1, generally above 0.2. Likewise, with partial oxidation processes, the carbon monoxide content of the gas stream is generally at a level at which hydrocarbon formation would present a problem. While these difficulties can be overcome by the injection of steam prior to the shift reaction, this again is undesirable in the interests of economy. For each mole of carbon monoxide converted in the shift reaction a mole of steam is required. Therefore to effect conversion of a substantial proportion of the carbon monoxide, the gas fed to the shift stage should have a steam to carbon monoxide molar ratio of at least 0.5 and preferably at least 1.0.

We have devised a process whereby these difficulties may be overcome. In the present invention the gas stream is subjected to a shift reaction at temperatures significantly above those normally employed with iron oxide catalysts. In this specification this shift reaction is termed extra-high temperature shift to distinguish from the aforementioned conventional high temperature shift reaction. The provision of an extra-high temperature shift stage causes some of the carbon monoxide to be reacted to form carbon dioxide and hydrogen, thereby decreasing the carbon monoxide content and increasing the carbon dioxide content of the gas, so that the value of Z of the gas subjected to a subsequent conventional high temperature shift reaction is well below 4 bar abs. Furthermore, since the shift reaction is exothermic and is operated at high temperatures, the use of an extra-high temperature shift reaction has the advantage that more higher grade heat can be recovered.

It has been proposed in GB-A-No. 2179366 to subject a hydrocarbon feedstock to primary reforming with carbon dioxide, optionally plus steam, as the reforming gas, in tubes in an exchanger reactor, to subject the resultant primary reformed gas stream, together with more feedstock, steam, and optionally more carbon dioxide, to secondary reforming, and to pass the secondary reformed gas stream through the shell side of the exchanger reactor to supply heat to the primary reforming tubes. That reference suggests that the shell side of the exchanger reformer could be packed with a catalyst that catalyses the shift reaction so that some shift reaction takes place in that shell space and so that the heat evolved in that exothermic shift reaction augments the heating of the primary reforming tubes. However, the catalysts proposed are conventional iron chrome high temperature shift catalysts, or a steam reforming catalyst. The latter would of course tend to catalyse the reverse reforming process, producing methane, while the iron chrome catalysts would be liable, as aforesaid, to give rise to problems of hydrocarbon formation, even at the high temperatures evisaged.

It has been proposed in GB-A-No. 1043563 to subject a gas stream containing carbon monoxide and steam to a shift reaction using an iron/chrome catalyst at temperatures above 450° C., e.g. at 470°-520° C., prior to conventional shift reaction. In the specific example the gas stream was cooled from a temperature of 900° C. to 480° C. and then subjected to the shift reaction in order to avoid deposition of resinous compounds on the catalyst in the conventional shift stage.

It has also been proposed in GB-A-No 1540668 to operate a shift reaction at 400°-600° C., using particular catalysts comprising oxides of lanthanum, cobalt, nickel, and uranium supported on alpha alumina. In the specific examples the temperature employed was 556°-566° C. with a steam to dry gas molar ratio of 2-4.

Accordingly the present invention provides a process for the production of a hydrogen-containing gas stream comprising:

(a) forming a gas stream at a temperature above 700° C., said gas stream containing hydrogen, carbon monoxide and steam, and having a steam to dry gas molar ratio below 0.5 but a steam to carbon monoxide molar ratio of at least 0.5;

(b) cooling said gas stream to a temperature within the range 550° to 650° C.;

(c) passing said cooled gas stream over an iron-free catalyst effective at such temperatures to catalyse the shift reaction; and, preferably, (d) cooling the resultant shifted gas stream to a temperature below 500° C.

The gas stream fed to the iron-free shift catalyst preferably has a carbon monoxide to carbon dioxide molar ratio above 1.6, particularly above 1.9.

Catalysts that may be used in the extra-high temperature shift stage of the invention include metals such as platinum, or preferably, palladium, or mixtures thereof, on a support of a refractory material such as alumina or a calcium aluminate cement. Surprisingly, although palladium is known to be a good methanation catalyst (see for example Ind. Eng. Chem. Prod. Res. Dev., Vol 18 No 3, 1979, pages 186-191), when using palladium catalysts in the process of the invention, little methanation takes place. Since conventional methanation processes using platinum group metals generally employ steam to dry gas ratios below 0.1 and/or steam to carbon monoxide molar ratios below 1, and much lower temperatures, it is believed that, at least at the temperatures employed in the extra-high temperature shift process, the substantial amount of steam present in the gas fed to the extra-high temperature shift reaction inhibits the methanation activity of the catalyst.

Accordingly a further aspect of the invention provides a shift process wherein a gas mixture containing carbon monoxide, hydrogen and steam, and having a steam to dry gas molar ratio below 0.5, but a steam to carbon monoxide molar ratio above 0.5, is passed over a catalyst comprising palladium or platinum supported on a refractory material at an inlet temperature in the range 550° to 650° C.

As an alternative to the aforesaid palladium or platinum catalysts, the catalysts disclosed in the aforesaid GB-A-No 1540668 or in EP-A-No. 147569 (small particle size copper supported on a high surface area silica or magnesia support and said to be able to withstand temperatures of 500°-600° C.) could be used.

It has been found that, surprisingly, the presence of an oxide of an alkali metal, such as potassium or sodium, or of an alkaline earth metal, particularly barium, in the catalyst is advantageous. Such materials may be made by impregnating a refractory support with an aqueous solution of a compound of the alkali, or alkaline earth, metal followed by heating to decompose the compound to the oxide form. Typically the amount of alkali, or alkaline earth, metal compound that may be employed is from 10-30% by weight of the support. In addition to showing good activity in catalysts containing a metal such as palladium as aforesaid, catalysts that are free of such metals and comprise the product of calcining a support impregnated with such an alkali, or alkaline earth, metal compound, surprisingly also show significant activity for the extra-high temperature shift reaction, particularly at temperatures above about 580° C.

Although as mentioned above, catalysts containing palladium or platinum surprisingly exhibit little methanation activity under the conditions employed, some methanation may occur if the extra-high temperature shift reaction is operated at a low space velocity (SV), i.e. the inlet volume of gas (expressed as $Nm^3$ per hour) per $m^3$ occupied by the extra-high temperature shift catalyst. Catalysts that are free of metals, particularly those selected from Group VII of the Periodic Table, but which comprise a support impregnated with an alkali, or alkaline earth, metal compound exhibit activity for the shift reaction but no methanation activity and so may be of particular utility in the present invention. Therefore preferred catalysts are (a) platinum and/or palladium on a refractory support, which may be impregnated with an alkali, or alkaline earth, metal compound before or after incorporation of the palladium and heated to convert the alkali, or alkaline earth, metal compound to the oxide form, and (b) metal-free compositions comprising a refractory support impregnated with an alkali, or alkaline earth, metal compound and heated to decompose that compound to the oxide form.

Accordingly the present invention also provides a shift process wherein a gas stream containing carbon monoxide and steam is passed at a temperature within the range 55° to 650° C. over an iron-free catalyst comprising a refractory support material that has been impregnated with at least one alkali, or alkaline earth, metal compound and heated to decompose that compound to the oxide.

The catalyst may be in the form of a random packed bed of pellets, which may be of macroporous foams as described in our U.S.-A- No. 4810685, or in the form of a fixed bed, e.g. of honeycomb configuration or of macroporous foam as aforesaid. Such a fixed bed form of construction is advantageous in certain embodiments of the invention as will be described hereinafter.

As will be described hereinafter, the cooling steps can advantageously by effected by heat exchange with water in a boiler to raise steam, with steam (so as to superheat the latter), and/or with one or more gas streams employed in the gas generation step.

Where the gasification process involves partial oxidation (by which term we include secondary steam reforming wherein a primary steam reformed gas mixture is partially combusted using an oxygen-containing gas, e.g. air as is normal in the manufacture of ammonia synthesis gas, and passed over a secondary steam reforming catalyst), the gas stream will generally be at a temperature in an excess of 850° C. Heat is normally recovered from this gas stream by heat exchange with reactants fed to the gasification step, with water to raise steam, and/or with steam of heat exchange prior to a conventional high temperature shift stage. In one form of the invention the extra-high temperature shift stage of the present invention is interposed between such heat exchanges: since the shift stage is exothermic, the shifted gas will generally have a higher temperature than the feed thereto. This enables higher grade heat to be recovered. Thus the gas stream is first cooled, by heat exchange with reactants to the gasification stage and/or with steam or water, to a temperature in the range 550°–650° C., preferably 570°–630° C., and then subjected to the extra-high temperature shift reaction as aforesaid and then the shifted gas, which may have a temperature 10°–50° C. higher than the inlet temperature of the extra-high temperature shift stage, is then cooled to below 500° C., preferably to below 400° C., by heat exchange in one or more stages with reactants to the gasification stage, with water, and/or with steam.

In one embodiment of such a process, which is particularly suited to the upgrading of an existing plant so that the latter can operate at lower steam to feedstock carbon ratios in the reforming stage, and hence operate more efficiently, the catalyst required for the extra-high temperature shift stage, preferably in fixed bed form as aforesaid, is inserted in the pipework between the heat exchangers employed to cool the reformed gas to the next stage, which is normally a conventional high temperature shift stage. For example where the reformed gas is cooled in a first stage by heat exchange with water thereby producing steam, and then in a second stage with steam producing superheated steam, if the extra-high temperature shift stage is effected between these heat exchanges, the gas fed to the second heat exchanger will be hotter as a result of the exothermic shift reaction and so the degree of superheating of the steam can be increased. Likewise it is possible to have the steam raising and superheating stages reversed so that the reformed gas is first cooled by steam superheating and then, after the extra-high temperature shift reaction, heat is recovered by steam raising. Another alternative is to employ a two stage boiler with the extra-high temperature shift stage between the two boiler stages.

In another form of the invention, the extra-high temperature shift stage is effected, together with the reforming, in an autothermal reformer. THus the feedstock and steam is fed to the inlet end of tubes, containing a primary steam reforming catalyst, disposed inside a pressure vessel. The other, outlet, end of the tube communicate with the shell space of the vessel. An oxygen-containing gas, e.g. air, is introduced into the shell space adjacent the outlet end of the tubes and the primary reformed gas is partially combusted and fed through a bed of a secondary steam reforming catalyst disposed around the exterior surfaces of the tubes. The partially combusted reformed gas passes through this bed of secondary reforming catalyst, thereby coming towards equilibrium, and is then cooled by passage through an inert packing surrounding the tubes so that heat is transferred from the secondary reformed gas through the tube walls to the gas undergoing the primary reforming. The cooled secondary reformed gas then passes through a bed of the extra-high temperature shift catalyst disposed around the tubes. As the secondary reformed gas passes through the extra-high temperature shift catalyst bed, the shift reaction takes place with the evolution of heat which is transferred through the tube walls to supply heat to the mixture of feedstock and steam undergoing the primary reforming step. The provision of the extra-high temperature shift stage in such an autothermal reformer has the advantage that the "pinch" in the temperature profile along the tubes is less severe. Thus the minimum temperature difference across the tube walls is increased, thereby enabling a smaller proportion of oxygen to be used and so giving more efficient reforming of the feedstock and a lower secondary reforming temperature. The use of a smaller proportion of oxygen has the further advantage, where the oxygen-containing gas is air and the product gas is to be used for ammonia synthesis, that the amount of nitrogen introduced, in relation to the amount of hydrogen that is produced (after subjecting the product gas to conventional shift stage or stages), is closer to that required for ammonia synthesis.

In this embodiment it is also possible to provide for a bed of conventional high temperature shift catalyst around the tubes downstream of the extra-high temperature shift bed.

In another embodiment a double-tube reformer is employed. In a double-tube reformer the reforming is effected in a plurality of annular zones each containing a primary steam reforming catalyst. Each annular zone is formed by the spaced between an outer tube, which is closed at one end (the outlet end), and an inner tube disposed within the outer tube. The inner tube communicates with the annular zone inside the associated outer tube at the closed end of the outer tube. The assembly of the inner and outer tubes is disposed in a vessel and heated by means of a hot gas stream flowing past the external surfaces of the outer tubes. The feedstock/steam mixture is fed to the open end of each outer tube and passes through the annular catalyst filled zone and undergoes primary reforming. The reformed gas leaves the annular zone at the closed end of the outer tube and then passes through the inner tube. In some forms of double tube reformer heat is transferred from the reformed gas through the walls of the inner tubes thus supplying part of the heat required for the primary reforming, for example as described in EP-A-No. 124226. This has the effect of cooling the primary reformed gas as it passes through the inner tube. By disposing the extra-high temperature shift catalyst in the inner tube at an appropriate position, i.e. where the temperature of the gas has fallen, as a result of that heat transfer, to a temperature in the range 550° to 650° C., the exothermic extra-high temperature shift reaction can take place with the evolution of heat which can thus augment the sensible heat being transferred through the inner tube wall to the gas undergoing the primary reforming reaction in the annular catalyst filled zone.

The extra-high temperature shift stage of the present invention may be followed by one or more stages of shift, e.g. high temperature shift at an outlet temperature in the range 350°-500° C., then, after cooling, low temperature shift, e.g. at an outlet temperature in the range 200°-280° C. As mentioned above, the use of the extra-high temperature shift stage of the invention avoids the problems of hydrocarbon formation that may be encountered when feed gas of composition such that the parameter Z is above about 4 bar abs. is subjected to conventional high temperature shift using a catalyst containing iron oxide. By virtue of the extra-high temperature shift stage the value of Z may be decreased to well below 4 bar abs. so that the extra-high temperature shift stage can be followed by a conventional high temperature shift stage. However it may be possible to effect sufficient shifting in the extra-high temperature shift stage that the conventional high temperature shift stage may be omitted: thus the extra-high temperature shift stage may be followed by a low temperature shift stage. In this case the latter is preferably effected in a heat exchange reactor wherein the gas undergoing the shift reaction is in heat exchange with a coolant, such as water under pressure. In this way the low temperature shift stage can be effected in an essentially isothermal manner. Examples of this type of low temperature shift reaction are described in U.S.-A-No. 4,695442 and U.S.-A-No. 47821611.

It will be appreciated that it is not necessary that the gas composition that is subjected to the extra-high temperature shift stage has a composition such that the parameter Z is above about 4 bar abs. However the invention is of particular utility in such cases.

In the extra-high temperature shift stage it is possible that the catalyst employed may have some activity for the reverse reforming reaction at the temperature employed for the extra-high temperature shift reaction: this is undesired and the extent of the reverse reforming can be minimised by employing high space velocities, e.g. in the range from about 5000 to 20000 h$^{-1}$.

One embodiment of the invention is illustrated by reference to the accompanying drawing which is a diagrammatic elevation through an autothermal reformer.

In the drawing a pressure vessel 10 is provided at its lower end with an inlet port 12 for a natural gas and steam mixture and an outlet port 14 for product gas. Disposed in vessel 10 extending upwards from a tube sheet 16 are a plurality of primary reformer tubes 18 containing a primary steam reforming catalyst. These tubes 18 extend to upper end of the vessel whereat they communicate with the shell space inside vessel 10. Adjacent the upper ends of tubes 18 is disposed a bed 20 of secondary reforming catalyst disposed around the tubes 18 to which air is supplied via tubes 22 extending up through the vessel from an inlet 24. Beneath secondary reforming catalyst bed, and disposed around tubes 18, are, in order, a bed 26 of an inert packing material, a bed 28 of an extra-high temperature shift catalyst, and a bed 30 of conventional high temperature shift catalyst.

In Table 1 are shown the gas compositions and temperatures calculated for an example of the process of the invention using the above apparatus and a methane/-steam mixture at a temperature of 300° C. and a pressure of 38 bar abs. as the feed to inlet 12 and air at a temperature of 400° C. and a pressure of 35 bar abs. as the feed to air inlet 24. The product from outlet 14, at 400° C. and at a pressure of about 34 bar abs., contains about 2.8% by volume carbon monoxide and about 53.6% hydrogen on a dry basis. The gas compositions are also quoted for the gas both inside and outside the tubes at the levels A, B, and C corresponding respectively to the outlet of the extra-high temperature shift bed 28 (inlet of the conventional high temperature shift bed 30), outlet of inert packing bed 26 (inlet of extra-high temperature shift bed 28), and the outlet of the secondary reforming catalyst bed 20 (inlet of the inert packing bed 26).

TABLE 1

| | Feed | inside tubes 18 | | | Air | outside tubes 18 | | | Prod |
|---|---|---|---|---|---|---|---|---|---|
| | 12 | A | B | C | 24 | C | B | A | 14 |
| CH$_4$ | 1000 | 950 | 851 | 541 | | 15 | 15 | 15 | 15 |
| CO | | 1 | 11 | 186 | | 651 | 651 | 299 | 154 |
| CO$_2$ | | 49 | 138 | 273 | 1 | 335 | 335 | 687 | 832 |
| H$_2$O | 2750 | 2651 | 2464 | 2017 | 10 | 2268 | 2268 | 1916 | 1771 |
| H$_2$ | | 199 | 584 | 1651 | | 2462 | 2462 | 2814 | 2959 |
| N$_2$ | | | | | 1544 | 1544 | 1544 | 1544 | 1544 |
| O$_2$ | | | | | 414 | | | | |
| Ar | | | | | 19 | 19 | 19 | 19 | 19 |
| Temp (°C.) | 300 | 465 | 573 | 754 | 400 | 1000 | 625 | 525 | 400 |

It is seen from Table 1 that, prior to the "extra-high temperature" shift, the gas stream (i.e. the gas at level B outside the tubes) has a Z value of about 6.4 bar abs. and so is such that hydrocarbon formation would be liable to occur if the gas was subjected to conventional high temperature shift without modification of its composition.

In Table 2 the temperature different (T$_{dif}$) across the tube 18 walls is quoted for the various levels.

TABLE 2

| | shell side bed position | T$_{dif}$ (°C.) |
|---|---|---|
| Level C | secondary reforming catalyst bed 20 outlet | 246 |
| Level B | extra-high temperature shift bed 28 inlet | 51 |
| Level A | extra-high temperature shift bed 28 outlet | 60 |
| Product 14 | high temperature shift bed 30 outlet | 100 |

It is seen from Table 2 that a minimum temperature difference, i.e. "pinch", (of 51° C.) between the shell-side and the tube-side occurs at the inlet end of bed 28. It has been calculated that, to produce the same amount of hydrogen, if the bed 28 was of inert packing material instead of extra-high temperature shift catalyst, the air flow rate needs to be increased by about 7% to give the same minimum temperature difference, i.e. "pinch", of 51° C.

In this calculated example the amount of air employed is such that there is introduced an excess of nitrogen over that required for ammonia synthesis: thus the product 14 gas stream, i.e. after the high temperature shift stage, has a hydrogen "equivalent" (i.e. hydrogen plus carbon monoxide, most of which can be converted to hydrogen in a subsequent low temperature shift process) to nitrogen molar ratio of about 2. For ammonia synthesis about 506 kg mol/hr of the nitrogen will need to be removed at a subsequent stage, for example in a pressure swing adsorption process as described in U.S.-A-No. 4695442. If, as mentioned above, the extra-high temperature shift catalyst were to be replaced by inert packing, so that an extra 7% of air had to be supplied, not only would additional power be required to compress the additional air, but also the hydrogen "equivalent" to nitrogen molar ratio of the product gas would be lower, e.g. about 1.9, and the excess of nitrogen, i.e. the amount that subsequently has to be removed, would be increased to about 614 kg mol/hr, i.e. an increase of about 20%.

To illustrate that shift can be effected readily at high temperatures in the following experiments, using a reactor of 25.4 mm internal diameter, a gas with a low steam to dry gas ratio was preheated in a preheater section to a temperature of 250° C. and then passed, at a pressure of 30 bar abs., through bed of catalyst maintained at a temperature of 600° C. at various gas flow rates. The carbon monoxide concentration was monitored at the inlet and outlet. Because of experimental limitations, the catalyst was supported in the reactor on a bed of fused alumina chips which extended through the preheater section. Blank runs were also performed with the catalyst replaced by the fused alumina chips and with the reactor empty, i.e. containing no chips or catalyst.

The experiments were performed with two different catalysts. In one set of experiments the catalyst (catalyst A) was about 100 ml of cylindrical pellets of 3.2 mm diameter and 3.2 mm length consisting of a calcined calcium aluminate cement support impregnated with palladium. The amount of palladium was 0.03% by weight of the support. In the other set of experiments the catalyst (catalyst B) consisted of an end-to-end stack of three sintered alpha alumina honeycomb structures each of 35.4 mm diameter and 50.8 mm length having 138 through passages having a cross section in the form of equilateral triangles of side about 2 mm. This honeycomb catalyst thus had a volume of about 77 ml. Prior to use the honeycombs, which did not have a wash coat, had been dipped in a solution of palladium nitrate and calcined at 500° C.

In the experiments the gas employed was a mixture of 1 part by volume of steam and 3 parts by volume of a gas containing about 19% by volume of carbon oxides (of which about 70% by volume was carbon monoxide) and correspondingly about 81% of a mixture of hydrogen and nitrogen (2 parts by volume of hydrogen to 1 part by volume of nitrogen). At the pressure employed (30 bar abs.) this has a Z value of about 11.3 bar abs.

The results are shown in Table 3 where the carbon monoxide contents are quoted on a dry gas volume basis. The quoted proportion of the carbon monoxide converted is given by $$\%CO_{conv} = 100X/CO_{in}$$

where $X = 100(CO_{in} - CO_{out})/(100 + CO_{out})$ and $CO_{in}$ and $CO_{out}$ are respectively the observed inlet and outlet carbon monoxide dry gas concentrations expressed as percentages. The outlet Z values are also quoted and are derived from the measured inlet and outlet carbon monoxide concentrations rather than on a full analysis of the outlet gas and assume that the inlet gas contained 19% by volume (on a dry basis) of carbon oxides and so are only approximate.

TABLE 3

| Catalyst | flow rate (l/h) | SV ($h^{-1}$) | $CO_{in}$ (%) | $CO_{out}$ (%) | $CO_{conv}$ (%) | $Z_{out}$ (bar abs) |
|---|---|---|---|---|---|---|
| none | 2000 | — | 13.7 | 12.8 | 6 | 10.3 |
| alumina chips | 2000 | — | 13.3 | 12.0 | 9 | 8.3 |
| A (pellets) | 2000 | 20000 | 13.2 | 10.3 | 20 | 5.5 |
| B (honeycomb) | 2000 | 26000 | 13.3 | 10.7 | 18 | 6.1 |
| alumina chips | 1000 | — | 13.5 | 11.2 | 15 | 7.0 |
| A (pellets) | 1000 | 10000 | 13.2 | 8.1 | 36 | 3.2 |
| B (honeycomb) | 1000 | 13000 | 13.3 | 8.4 | 34 | 3.4 |
| alumina chips | 500 | — | 13.7 | 11.3 | 16 | 7.2 |
| A (pellets) | 500 | 5000 | 13.2 | 7.6 | 39 | 2.8 |
| B (honeycomb) | 500 | 6500 | 13.2 | 7.4 | 41 | 2.6 |

It is seen from Table 3 that the reactor itself (which was made from a nickel steel) exerted some shift activity and this was augmented by the alumina chips. However the amount of shifting given by the reactor itself, whether alone or in conjunction with the alumina chips, is insufficient to decrease the Z value to a level at which the outlet gas could be subjected to conventional high temperature shift without the risk of hydrocarbon formation. It is also seen from Table 3 that both the pellet and honeycomb catalysts gave a substantial degree of shifting, and that, if the space velocity (SV) is not too high, a gas having a Z value below 4 bar abs. can be achieved. No methane was observed in the shifted gas in the experiments performed at flow rates of 1000 and 2000 l.h$^{-1}$ while at a flow rate of 500 l.h$^{-1}$, the shifted gas produced using the pellet catalyst A and the honeycomb catalyst B contained respectively 0.15% and 0.25% of methane (by volume on a dry basis), indicating that at the space velocities employed, the amount of reverse reforming was very small. These methane contents correspond to a reforming equilibrium temperature of over 1000° C. If the reverse reforming equilibrium at 600° C. had been reached, the methane content of the gas stream would be about 20% by volume on a dry gas basis.

In another series of experiments to ascertain the activity of various catalytic materials for the shift reaction at high temperatures, the reverse shift reaction was effected by passing a gas at atmospheric pressure through a bed of catalyst pieces of size in the range 3 to 5 mm at a space velocity of 5000 h$^{-1}$ at various temperatures. The gas employed was a mixture of hydrogen (about 60% by volume), carbon dioxide (about 10% by volume) and steam (about 30% by volume). The carbon dioxide and carbon monoxide contents (on a volumetric dry gas basis) were monitored.

The catalysts employed were as follows:

A Catalyst A as used in the previous experiments, i.e. palladium on a calcined calcium aluminate cement support.

B Catalyst A impregnated with 15% by weight of potassium carbonate and calcined.

C A calcium aluminate cement support impregnated with about 20% by weight of potassium carbonate and calcined.

E A calcium aluminate cement support impregnated with about 18% by weight of sodium carbonate and calcined.

F A calcium aluminate cement support impregnated with barium nitrate and calcined.

G A calcined calcium aluminate cement support.

H An alumina support impregnated with about 12% of sodium carbonate and calcined.

From the outlet carbon monoxide and carbon dioxide contents it is possible to calculate the percentage of the carbon dioxide converted $$CO_{2\ conv} = 100 \times CO_{out}/(CO_{2\ out} + CO_{out})$$

and also the outlet hydrogen content $$H_{2\ out} = 100 - (CO_{2\ out} + CO_{out})$$

and, since the amount of steam produced in the shift reaction equals the amount of carbon dioxide produced, if it is assumed that the inlet gas had a steam to carbon dioxide molar ratio of 3, the outlet steam content $$H_2O_{out} = 3 \times (CO_{2\ out} + CO_{out}) + CO_{out}$$

It is therefore possible to calculate the parameter K $$K = H_{2\ out} \times CO_{2\ out}/(H_2O_{out} \times CO_{out})$$

and, from published tables (for example in Appendix 7 of the "Catalyst Handbook" edited by Twigg, second edition, 1989, at pages 543-548), the equilibrium temperature $T_e$ can be found for which this parameter K corresponds. The approach to the equilibrium can thus be ascertained by deducting $T_e$ from the temperature employed in the experiment. The results are shown in Table 4. Because of the nature of the calculations, the approach is quoted to the nearest 20° C.

TABLE 4

| Temperature (°C.) | Catalyst | $CO_{2\ out}$ (%) | $CO_{out}$ (%) | $CO_{2\ conv}$ (%) | Approach (°C.) |
|---|---|---|---|---|---|
| 500 | A | 13.0 | 1.2 | 8 | 160 |
| 500 | C | 11.7 | 1.0 | 8 | 180 |
| 500 | D | 12.6 | 0.2 | 2 | 280 |
| 500 | E | 13.1 | 0.7 | 5 | 200 |
| 500 | F | 13.0 | 0.2 | 2 | 280 |
| 500 | G | 12.6 | 0.1 | 1 | >300 |
| 500 | H | 13.4 | 1.0 | 7 | 160 |
| 550 | A | 12.0 | 2.4 | 17 | 120 |
| 550 | C | 9.2 | 3.8 | 29 | 60 |
| 550 | D | 12.5 | 1.0 | 7 | 220 |
| 550 | E | 13.4 | 0.9 | 6 | 220 |
| 650 | F* | — | — | — | — |
| 550 | G | 12.6 | 0.3 | 2 | >300 |
| 550 | H | 10.3 | 4.0 | 28 | 40 |
| 600 | A | 9.5 | 5.5 | 37 | 20 |
| 600 | C | 7.3 | 5.4 | 43 | 20 |
| 600 | D | 10.1 | 3.6 | 26 | 100 |
| 600 | E | 10.9 | 3.6 | 25 | 120 |
| 600 | F | 11.2 | 2.8 | 20 | 160 |
| 600 | G | 11.5 | 1.4 | 11 | 240 |
| 600 | H | 9.4 | 4.7 | 33 | 60 |
| 650 | A | 8.6 | 6.5 | 43 | 20 |
| 650 | C | 6.3 | 7.2 | 53 | <20 |
| 650 | D* | — | — | — | — |
| 650 | E | 8.0 | 6.8 | 46 | <20 |
| 650 | F* | — | — | — | — |
| 650 | G | 10.8 | 2.4 | 18 | 220 |
| 650 | H | 8.4 | 7.0 | 45 | <20 |

*not tested at this temperature

It is seen from Table 4 that catalyst G i.e. the calcium aluminate support alone, had little catalystic activity and what activity there was probably represented the activity resulting from the material (stainless steel) of the reactor walls. However it is seen that the catalysts impregnated with an alkali, or alkaline earth, metal compound, i.e. catalysts C, D, E, F and H, have a significant activity at the higher temperatures. The palladium containing catalyst A and C have little activity at below 550° C. Although these experiments were for the reverse shift reaction, it is expected that they would show similar activity for the forward shift reaction.

No methane was detected in the outlet gas streams: if the catalysts had exhibited methanation activity, significant amounts of methane would have been expected as the calculated equilibrium methane contents are about 1, 3, 8, and 14% by volume on a dry basis for the temperatures 650°, 600°, 550°, and 500° C. respectively.

We claim:

1. A process for the production of a hydrogen-containing gas stream comprising:
   (a) forming a gas stream at a temperature above 700° C., said gas stream containing hydrogen, carbon monoxide and steam, and having a steam to dry gas molar ratio below 0.5 but a steam to carbon monoxide molar ratio of at least 0.5;
   (b) cooling said gas stream to a temperature within the range 550° to 650° C.; and
   (c) passing said cooled gas stream over an iron-free catalyst consisting essentially of a refractory support, selected from alumina and a calcium aluminate cement, and at least one material selected from platinum, palladium, and an oxide of an alkali or alkaline earth metal,
   whereby some shift reaction is effected giving a gas having a composition such that the parameter Z is below 4 bar abs., where Z is given by the formula $$Z = [CO]^2 \cdot [H_2]/([CO_2] \cdot [H_2O])$$

where [CO], [H$_2$], [CO$_2$] and [H$_2$O] represent the partial pressures (in bar abs.) of carbon monoxide, hydrogen, carbon dioxide, and steam respectively in the gas.

2. A process according to claim 1 wherein the gas stream fed to the iron-free catalyst has a carbon monoxide to carbon dioxide molar ratio above 1.6.

3. A process according to claim 1 wherein gas fed to the iron-free catalyst has a composition such that the parameter Z is above 4 bar abs. where Z is given by the formula $$Z = [co]^2 \cdot [H_2]/([CO_2] \cdot [H_2O])$$

where [CO], [H$_2$], [CO$_2$] and [H$_2$O] represent the partial pressures (in bar abs.) of carbon monoxide, hydrogen, carbon dioxide, and steam respectively in the gas.

4. A process according to claim 1 wherein after passing the gas through the bed of iron-free catalyst, the gas is cooled to a temperature below 500° C., and subjected to high temperature shift using a catalyst containing iron oxide at an outlet temperature in the range 350°-500° C, 5. A process according to claim 1 wherein after passing the gas through the bed of iron-free catalyst, the gas is cooled and then subjected to low temperature shift effected in heat exchange with a coolant under pressure and at an outlet temperature in the range 200°-280° C.

6. A process according to claim 1 wherein the gas is fed to the iron-free catalyst at a space velocity in the range from 5000 to 20000 $h^{-1}$.

7. A process according to claim 1 wherein a reforming process producing the gas stream at a temperature above 700° C. is effected in an autothermal reformer comprising a pressure vessel in which tubes, containing a primary steam reforming catalyst, are disposed, said tubes having an inlet end and an outlet end with said outlet end communicating with the shell space of the vessel, said process comprising:
    (a) feeding a mixture of a hydrocarbon, or hydrocarbon derivative, feedstock and steam to the inlet end of said tubes, effecting primary steam reforming of said feedstock in said tubes, and discharging the primary reformed gas from the outlet end of said tubes into said shell space;
    (b) partially combusting the primary reformed gas by introducing an oxygen-containing gas into said shell space adjacent said outlet end of said tubes, and feeding the partially combusted primary reformed gas through a bed of a secondary steam reforming catalyst disposed around the exterior surfaces of the tubes to bring said partially combusted primary reformed gas towards equilibrium thereby forming a secondary reformed gas;
    (c) cooling said secondary reformed gas to a temperature within the range 550° to 650° C. by passage through an inert packing surrounding the tubes so that heat is transferred from the secondary reformed gas through the tube walls to the gas undergoing the primary reforming; and
    (c) passing said cooled secondary reformed gas through a bed of the iron-free catalyst disposed around the tubes, whereby heat evolved in the shift reaction is transferred through the tube walls to heat the gas undergoing primary reforming in the tubes.

8. A process according to claim 1 wherein a reforming process producing the gas stream at a temperature above 700° C., is effected in annular zones, in which a steam reforming catalyst is disposed, each annular zone having an inlet end and an outlet end and is formed between an outer tube, which is closed at the outlet end of said annular zone, and an inner tube, the interior of which communicates with said annular zone at the closed outlet end of the outer tube, said annular zones being heated by means of a hot gas stream flowing past the external surfaces of the outer tubes, said process comprising:
    (a) feeding a mixture of a hydrocarbon, or hydrocarbon derivative, feedstock and steam to the inlet end of each of said annular zones, effecting primary steam reforming of said feedstock in said annular zones, and discharging the primary reformed gas from the outlet end of each annular zones into the interior of the inner tube associated with that annular zone;
    (b) cooling said primary reformed gas to a temperature within the range 550° to 650° C. as it passes through the interior of the inner tubes by transfer of heat from the primary reformed gas through the walls of each inner tube to the gas associated with that inner tube; and
    (c) passing said cooled primary reformed gas through a bed of iron-free catalyst disposed within each of said inner tubes, whereby heat evolved in the shift reaction is transferred through the wall of the inner tube and augments the sensible heat being transferred through the inner tube wall to the gas in the annular zone undergoing the primary reforming reaction.

* * * * *